(12) United States Patent
Lehane et al.

(10) Patent No.: US 9,204,279 B2
(45) Date of Patent: Dec. 1, 2015

(54) SYSTEM AND METHOD FOR CHARGING FUTURE STATE STATUS NOTIFICATIONS

(71) Applicant: OPENET TELECOM LTD., Dublin (IE)

(72) Inventors: Bart Lehane, Dublin (IE); Alan McNamee, Dublin (IE); Max Bacik, Dublin (IE)

(73) Assignee: OPENET TELECOM LTD., Dublin (IE)

( * ) Notice: Subject to any disclaimer, the term of this patent is extended or adjusted under 35 U.S.C. 154(b) by 173 days.

(21) Appl. No.: 13/942,907

(22) Filed: Jul. 16, 2013

(65) Prior Publication Data

US 2014/0018036 A1   Jan. 16, 2014

Related U.S. Application Data

(60) Provisional application No. 61/671,933, filed on Jul. 16, 2012.

(51) Int. Cl.
*H04W 4/26* (2009.01)
*H04W 4/24* (2009.01)
*H04M 15/00* (2006.01)
*H04M 17/02* (2006.01)
*H04M 17/00* (2006.01)
*H04L 12/24* (2006.01)
*H04L 12/14* (2006.01)

(52) U.S. Cl.
CPC ............. *H04W 4/24* (2013.01); *H04L 12/1407* (2013.01); *H04L 41/0893* (2013.01); *H04M 15/66* (2013.01); *H04M 15/83* (2013.01); *H04M 15/852* (2013.01); *H04M 17/02* (2013.01); *H04M 17/20* (2013.01); *H04M 17/201* (2013.01); *H04M 17/204* (2013.01); *H04L 12/1432* (2013.01); *H04L 41/0896* (2013.01); *H04M 15/85* (2013.01)

(58) Field of Classification Search
CPC .................................. H04W 4/24; H04W 4/26
USPC .................................................. 455/406, 408
See application file for complete search history.

(56) References Cited

U.S. PATENT DOCUMENTS

| | | | |
|---|---|---|---|
| 6,098,878 A * | 8/2000 | Dent et al. | 235/380 |
| 8,494,918 B1 * | 7/2013 | Vinnitskiy | 705/26.4 |
| 2003/0143978 A1 * | 7/2003 | Cooper et al. | 455/406 |
| 2008/0182552 A1 * | 7/2008 | Dinh et al. | 455/408 |
| 2010/0114742 A1 * | 5/2010 | Yan et al. | 705/34 |
| 2012/0054661 A1 * | 3/2012 | Rados et al. | 715/772 |
| 2012/0155296 A1 * | 6/2012 | Kashanian | 370/252 |
| 2012/0166079 A1 * | 6/2012 | Tornkvist et al. | 701/439 |
| 2012/0329424 A1 * | 12/2012 | Gudlavenkatasiva et al. | 455/406 |
| 2013/0005298 A1 * | 1/2013 | Lehtonen et al. | 455/406 |

* cited by examiner

*Primary Examiner* — Christopher M Brandt
(74) *Attorney, Agent, or Firm* — The Marbury Law Group, PLLC

(57) ABSTRACT

A telecommunication network may include a policy management system and a charging system. The charging system may be configured to receive a request for subscriber state information relating to a subscriber from the policy management system, retrieve current subscriber state information from memory, determine future subscriber state information for the subscriber, generate a communication message that includes the current subscriber state information and the future subscriber state information, and send the generated communication message to the server computing device.

20 Claims, 10 Drawing Sheets

SYSTEM AND METHOD FOR CHARGING FUTURE STATE STATUS NOTIFICATIONS

RELATED APPLICATIONS

This application claims the benefit of priority to U.S. Provisional Application No. 61/671,933, titled "System and Method for Charging Future State Status Notifications" filed Jul. 16, 2012, the entire contents of which are hereby incorporated by reference.

BACKGROUND

Telecommunications networks have seen very rapid advances in their numbers of users, and the types of services available. In particular, the combination of data-orientated mobile telecommunications networks (e.g., 3G, 4G, LTE, Wi-Fi, etc.) and feature rich smart phones and tablet devices has enabled users to consume a greater variety of services. These increases in the number of users and the types of services available have increased the need for improved charging systems.

Generally, a charging system (such as a 3GPP Online Charging System (OCS)) may indicate the status of a balance state to a policy management system (such as a 3GPP Policy and Charging Rules Function (PCRF)). For example, when a subscriber goes from a state of "IN CREDIT" to a state of "OUT OF CREDIT", the OCS may inform the PCRF so that the PCRF may make a new policy decision. This could be achieved using the Diameter based Sy interface in the 3GPP Policy and Charging Control (PCC) architecture, but could also be accomplished using any other interface or protocol.

At certain times, many of these updates may need to be sent at the same time. This may occur at a common time when many balance state changes occur—for example at the end of a monthly billing cycle, or at midnight when a daily balance is reset. This introduces significant signaling load on the charging and policy management systems, and potentially between the policy management systems and other nodes in the network. As such, improved policy and charging systems that reduce this signaling traffic will be beneficial to telecommunication service providers and consumers of services provided by telecommunication networks.

SUMMARY

The various aspects include methods of communicating information in a telecommunication network, which may include receiving in a processor a request for subscriber state information relating to a subscriber from a server computing device in the telecommunication network, retrieving current subscriber state information from memory, determining future subscriber state information of the subscriber, generating a communication message that includes the current subscriber state information and the future subscriber state information, and sending the generated communication message to the server computing device.

In an embodiment, determining future subscriber state information of the subscriber includes generating information that includes at least one of balance information, a time value, and a probability value. In a further embodiment, sending the generated communication message to the server computing device includes sending the generated communication message to a policy management system server.

In a further embodiment, sending the generated communication message to the server computing device includes sending the generated communication message to a notification system server. In a further embodiment, the method includes receiving the communication message in the notification system server, and sending a subset of the information included in the received communication message to a user equipment device. In a further embodiment, sending the generated communication message to the policy management system server includes sending the generated communication message from a charging system server to the policy management system server.

In a further embodiment, generating the communication message that includes the current subscriber state information and the future subscriber state information includes generating the communication message to include current and future information for a group of subscribers. In a further embodiment, generating the communication message to include current and future information for the group of subscribers includes identifying the group of subscribers via a group name. In a further embodiment, determining future subscriber state information of the subscriber includes generating information that includes a recurring rule. In a further embodiment, generating the communication message that includes the current subscriber state information and the future subscriber state information includes generating the communication message to include service start time information and service termination information.

Further embodiments may include a computing device having a processor configured with processor-executable instructions to perform various operations corresponding to the methods discussed above.

Further embodiments may include a computing device having various means for performing functions corresponding to the method operations discussed above.

Further embodiments may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DESCRIPTION

Figure 1:
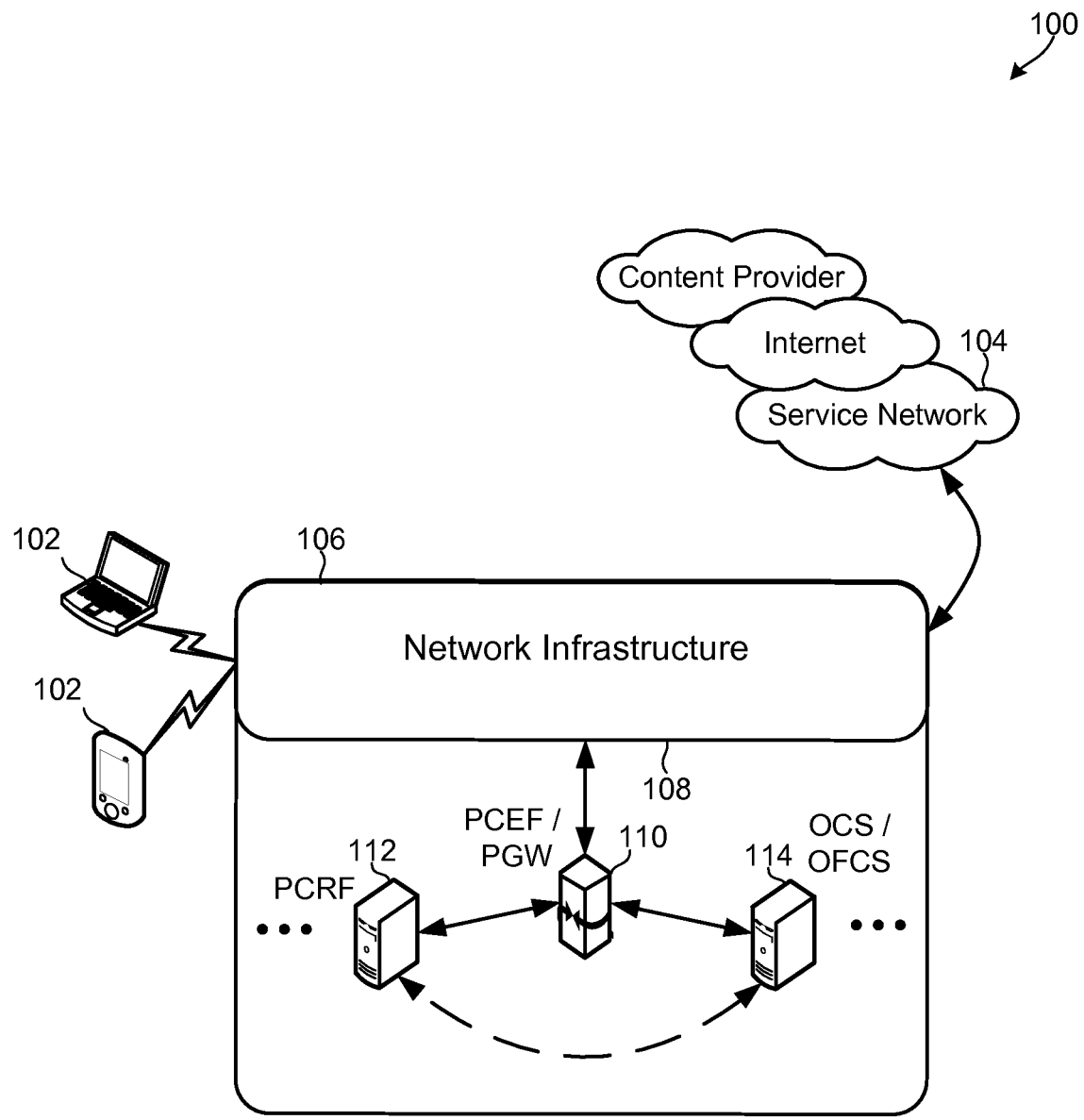
FIG. 1 is a system block diagram illustrating a telecommunications system suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods, and servers configured to implement the methods, of generating and communicating information between nodes/components in a telecommunication network so as to reduce the number of communications that are required between such components when providing telecommunication services to users of the telecommunication network.

The word "exemplary" is used herein to mean "serving as an example, instance, or illustration." Any implementation described herein as "exemplary" is not necessarily to be construed as preferred or advantageous over other implementations.

As used in this application, the terms "component," "module," "node," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a single process and/or thread of execution. A component may be localized on one processor or core, or distributed between two or more processors or cores. In addition, components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of signaling and content messages. It should be understood that any references to terminology and/or technical details related to an individual standard or technology are for illustrative purposes only, and are not intended to limit the scope of the claims to a particular communication system or technology unless specifically recited in the claim language.

The terms "mobile device," "wireless device" and "user equipment (UE)" may be used interchangeably and refer to any one of various cellular telephones, smart-phones (e.g., iPhone®), personal data assistants (PDA's), palm-top computers, tablet computers, laptop computers, wireless electronic mail receivers (e.g., Blackberry®), VoIP phones, wireline devices, devices implementing Machine-to-Machine (M2M) technologies, multimedia/Internet enabled cellular telephones, and similar electronic devices capable of sending and receiving wireless communication signals. A wireless device may include a programmable processor and memory. In a preferred embodiment, the wireless device is a cellular handheld device (e.g., a mobile device), which can communicate via a cellular telephone communications network.

Generally, telecommunication networks include a plurality of nodes, systems and/or components that are each responsible for providing or implementing a specific functionally for that network. For example, modern telecommunication networks typically include a policy management system and a charging system. The charging system is generally responsible for storing and managing a subscriber's billing and/or charging information. The policy management system is generally responsible for determining and/or enforcing policy rules to control the bandwidth, the quality of service (QoS), and other characteristics of the communications between the network and user equipment.

The policy management system may require access to information that is stored in a charging system to successfully determine and/or enforce the policy rules so that the network may successfully route voice, data or control signals between the network and user equipment. Yet, using existing solutions, a large number of communication messages must be generated and communicated between the policy management system and the charging system for the network to accomplish such operations or function properly. Generating and communicating large numbers of these messages is an inefficient use of resources that may negatively impact the latency or performance characteristics of the network or user equipment.

The various embodiments include charging systems configured to reduce the number of communication messages that are communicated in a telecommunication network when processing or routing voice, data or control signals between the network and user equipment.

Generally, charging systems may send current information for a specific user, subscriber or account to the policy management system. This information is typically sent in response to the charging system receiving a request message (i.e., a request for charging or billing information) from the policy management system. Charging systems may also send updated communication messages to the policy management system when there is a change to a status, state or value that is relevant to information previously sent to the policy management system. These updated communication messages also include current information, but are sent in response to the charging system detecting changes in the relevant information.

Existing charging systems, such as those disclosed in "3GPP TS 32.296 Charging management; Online Charging System (OCS): Applications and interfaces V11.5.0," only send current information to the policy management system. Further, these existing systems do not intelligently determine, compute or predict future information or identify information that is most likely to be relevant to the policy management system at a future time or date. Rather, existing charging systems simply wait for the current information to change, and then send the changed current information to the policy management system. This typically means that the charging system sends a new communication message each time there is a change. This is an inefficient use of network resources that may negatively impact the latency or performance characteristics of the nodes, network, or user equipment.

As an example, a charging system may be configured to inform the policy management system when there is a change in a "Policy Counter" variable. This may be accomplished by the charging system sending the policy management system a "Spending-Status-Notification" message when a subscriber's balance state changes from "IN_CREDIT" to "OUT_OF_CREDIT." The policy management system may receive the "Spending-Status-Notification" message, and perform various policy-based operations based on the updated information included in the message. For example, the policy management system may generate and/or enforce a new policy rule that limits the subscriber's access to the telecommunication network. Using existing solutions, when the subscriber's balance state changes again from "OUT_OF_CREDIT" to "IN_CREDIT," the charging system generates and sends another communication message to the policy management system to inform it of the changes.

The operations associated with generating these additional communication messages each time there is a change, and the additional network traffic generated by communicating such messages, may consume an excessive amount of the network's available resources (e.g., bandwidth, etc.) and/or otherwise negatively impact the performance of the nodes, network, or user equipment.

The various embodiments include charging systems configured to intelligently compute, generate, determine, and/or predict future information that may be used by a policy management system to make policy decisions in and/or for a future time or event. By enabling the policy management system to make policy decisions in and/or for the future, the various embodiments reduce the number of times that the policy management system will request information from the charging system. This reduces the number of communication messages that are sent from the charging system to the policy management system, and improves the latency times, bandwidth utilization, and the overall performance of the network.

In a further embodiment, the charging system may be configured to send the future information to the policy management system in the same communication message, flow, or stream as the current information. For example, the charging system may be configured to bundle predicted future information with the requested current information in the 'Spending-Status-Notification-Request' message, and send all this information to the policy management system in one communication message. This further reduces the number of communication messages that are generated and communicated in the network, which further improves the latency times, bandwidth utilization, and the performance characteristics of the network.

In an embodiment, a charging system may be configured to bundle time-based information (e.g., time or date the account will be replenished) to the current information and send all the information to the policy management system in a single communication message.

For example, a charging system may store time-based information that identifies a subscriber as having a daily or monthly spending allowance that is automatically replenished at a certain time or date. In a conventional network, the charging system will send a first communication message to the policy management system when the daily or monthly spending allowance has been exhausted. The charging system will then send a second communication message when the spending allowance is replenished.

Unlike these conventional solutions, an embodiment charging system may be configured to bundle the time-based information (i.e., information that identifies when the account is scheduled to be replenished) with the current information (i.e., information that indicates that the daily or monthly spending allowance has been exceeded), and send all such information to the policy management system in one communication message. The charging system may then deregister the policy management system from receiving future updates regarding the replenishment of that allowance, and notify the policy management system only when the account is not replenished at the scheduled time. The policy management system may be configured to automatically allow the subscriber to access the network after the replenishment date/time indicated in the communication message, unless it receives another communication message from the charging system instructing it otherwise.

As an example, take a subscriber that goes from a state of "IN_CREDIT" to a state of "OUT_OF_CREDIT" as they have used up a daily or monthly spending allowance. The charging system will inform the policy management system of this state change as normal. If the charging system knows that at midnight the subscriber state will be reset to "IN_CREDIT" then it can also inform the policy management system of the future state change in the same message. This will negate the need for the charging system to send a notification at midnight indicating that the new state is "IN_CREDIT," as the policy management system will already be privy to this information.

In an embodiment, the charging system may include multiple independent sets of future state information relating to a user. In an enhanced embodiment, the charging system may describe multiple future states using a recurring rule (e.g. "every Sunday morning at midnight", "at 01:00 on the first day of each month", etc.). If the expected future state information changes, the charging system may update the policy management system at any point with this information.

The various embodiments may be implemented within a variety of communication systems, an example of which is illustrated in FIG. 1. A typical communication system 100 includes user equipment 102 configured to send and receive voice, data, and control signals to and from a service network 104 (and ultimately the Internet and/or a content provider) via a communications network 106.

In the example illustrated in FIG. 1, the communications network 106 includes a network infrastructure 108 unit that encapsulates various network components/systems, each of which may implement any of a variety of communication technologies/protocols to process and route the voice, data and control signals to and from the user equipment 102. For example, the network infrastructure 108 unit may include components for implementing a cellular telephone network, a radio access network (e.g., UTRAN, RAN, etc.), WiFi network, WiMAX network, and/or other well known communication technologies (e.g., GPRS, UMTS, LTE, cdmaOne, CDMA2000™). Since these structures are well known, certain details have been omitted in order to focus the descriptions on the most relevant features.

The network infrastructure 108 unit may include connections to a policy control enforcement function (PCEF) component 110, which may be responsible for enforcing policy rules to control the bandwidth, the quality of service (QoS), and other characteristics of the communications between the service network 104 and the user equipment 102. The enforcement of policies may also include querying, coordinating, removing, revoking and/or adjusting various resources (e.g., network resources, subscriber resources, etc.) based on the policy rules.

The PCEF component 110 may also be configured to send signaling information (e.g., control plane information relating to communication setup, security, authentication, charging, enforcement of policy rules, etc.) to a policy control rules function (PCRF) component 112, online/offline charging systems (OCS/OFCS) 114, and other similar components that participate in, collect information from, or otherwise contribute to, communications between the service network 104 and the user equipment 102.

Figure 2:
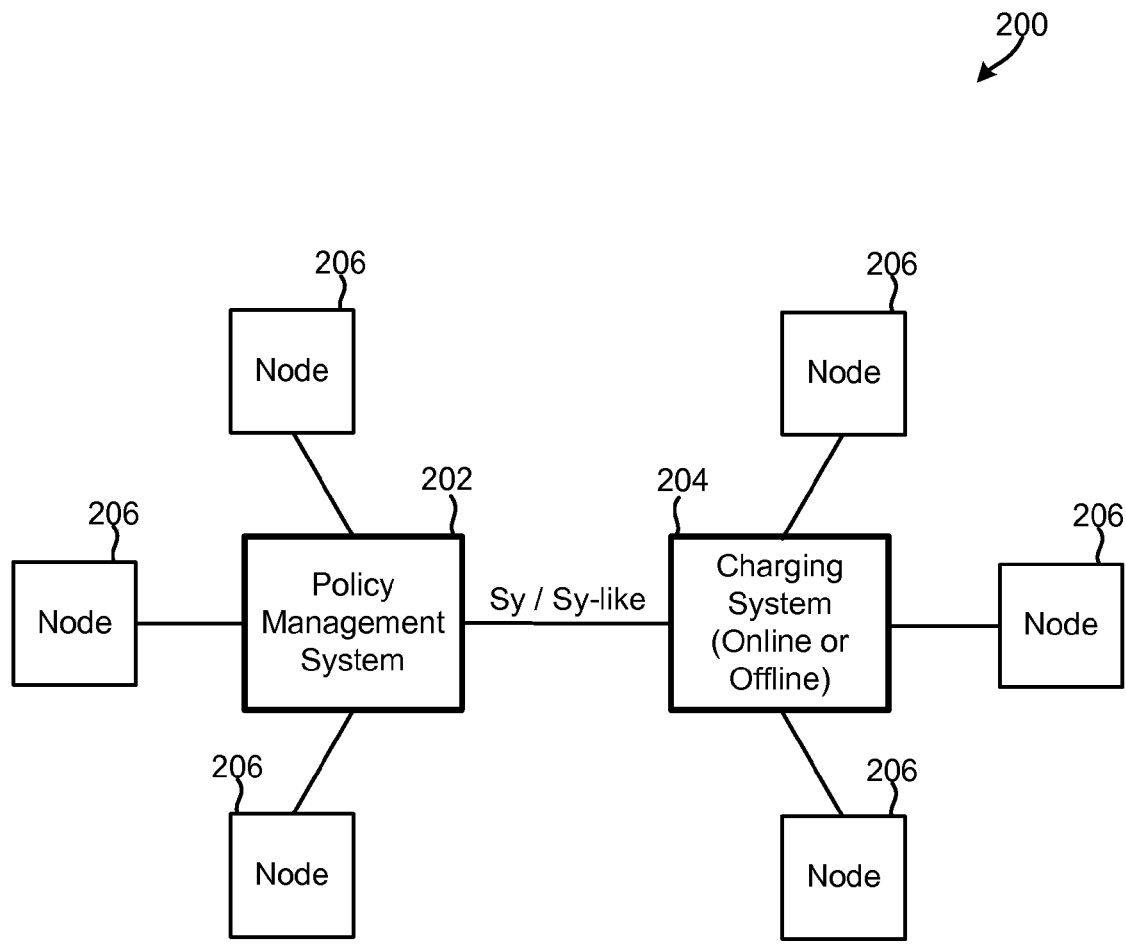
FIG. 2 is a block diagram illustrating components in an example telecommunication system that is suitable for use by the various embodiments.

FIG. 2 illustrates an example communication system 200 that includes a policy management system 202, a charging system 204, and a plurality of network nodes 206. The communication system 200 may be included in a network infrastructure 108 unit, such as that which is illustrated in FIG. 1. In an embodiment, the policy management system 202 may include a PCRF 112 component. In various embodiments, the charging system 204 may include an online charging system component, an offline charging system component, or both.

Each of the plurality of network nodes 206 may be configured to provide one or more network functionalities. For example, the plurality of network nodes 206 may include a PCEF component/node, application function (AF) component/node, subscription profile repository (SPR) component/node, unified data repository (UDR) component/node, etc.

The policy management system 202 may be configured to communicate with the charging system 204 and various network nodes 206, which may be accomplished using any known telecommunication technology, protocol, or standard. Similarly, the charging system 204 may be configured to communicate with the policy management system 202 and various network nodes 206 using any known telecommunication technology, protocol, or standard.

In the example illustrated in FIG. 2, the policy management system 202 and the charging system 204 may communicate via the Sy interface or a Sy-like interface. Details regarding the Sy interface may be found in 3GPP TS 29.219 V11.1.0 Policy and Charging Control: Spending Limit Reporting over Sy reference point, the entire contents of which are hereby incorporated by reference.

For ease of reference, various embodiments are described below using the Sy interface and related terminology. However, it should be understood that any references to such terminology and/or technical details are for illustrative purposes only, and are not intended to limit the scope of the claims to a particular protocol, standard, or technology unless specifically recited in the claim language.

The policy management system 202 may be configured to request current charging/billing information (e.g. balance state information) from the charging system 204. The charging system 204 may be configured to intelligently determine, predict, compute, and/or generate future information that is suitable for use by the policy management system 202 in making policy decisions in and/or for a future time or event. The charging system 204 may be configured to send the future information to the policy management system 202 in the same communication message, flow or stream as the requested current charging/billing information. For example, the charging system 204 may be configured to bundle predicted future information with current billing/charging information in a "Spending-Status-Notification" message, and send the bundled information to the policy management system in one communication message.

Figure 3:
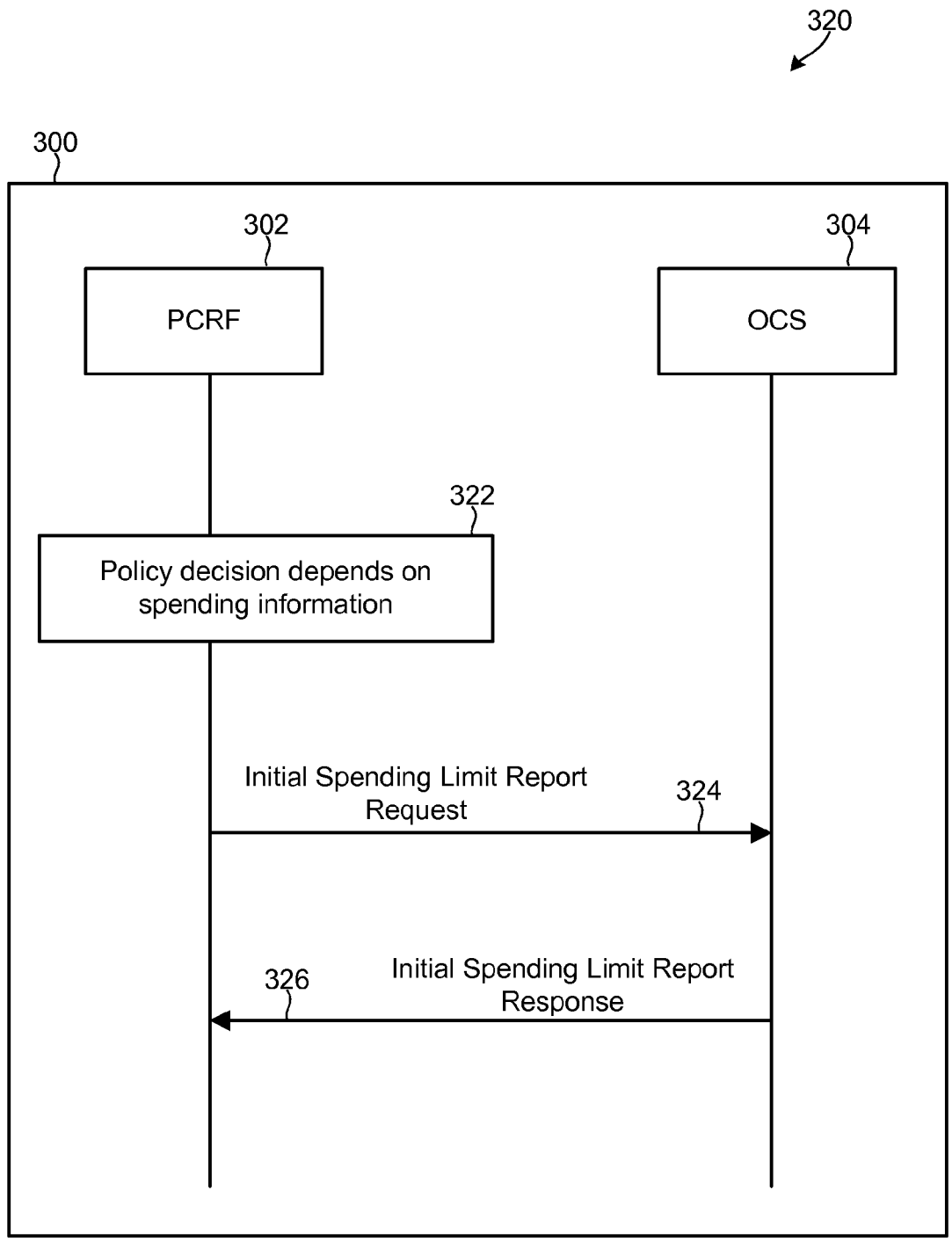
FIGS. 3 and 4 are call flow diagrams that illustrate various interactions and information flows between a policy system and a charging system when reporting a current spending limit in accordance with an embodiment.
Figure 4:
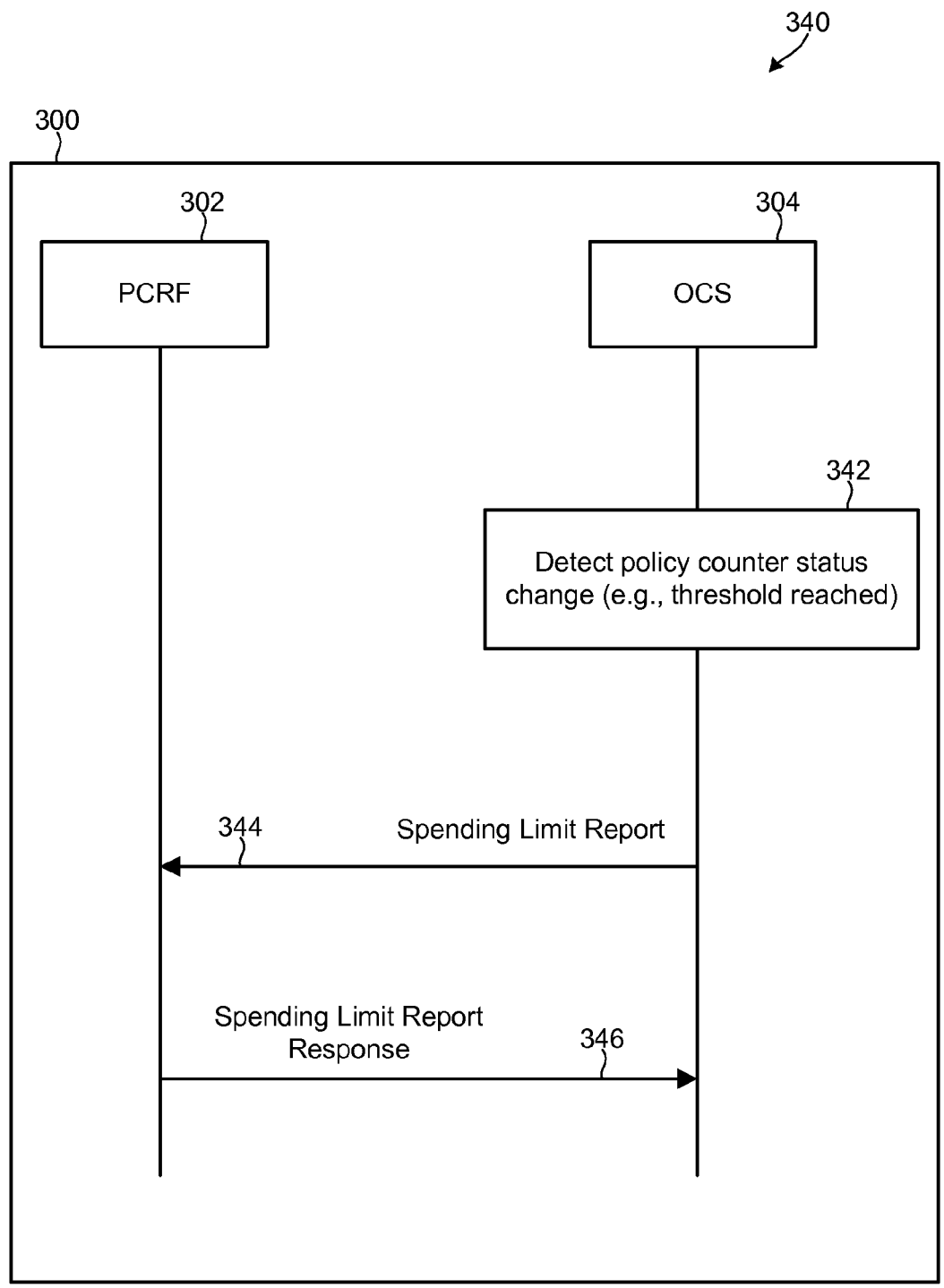

FIGS. 3 and 4 illustrate various components and information flows in an example network 300 that includes a PCRF component 302 and an OCS component 304. FIG. 3 illustrates a method 320 of registering the PCRF component 302 with the OCS component 304 to receive information and updates regarding the status of data stored in the OCS component 304. FIG. 4 illustrates a method 340 of notifying the PCRF component 302 of changes to the status of data stored in the OCS component 304.

With reference to FIG. 3, in determination operation 322, the PCRF component 302 may determine that one or more of its policy decisions/determinations depend on spending information stored in the OCS component 304. In operation 324, the PCRF component 302 may generate and send an "Initial-Spending-Limit-Report" request message to the OCS component 304. In operation 326, the OCS component 304 may generate and send an "Initial-Spending-Limit-Report" response message to the PCRF component 302. Also in operation 326, the OCS component 304 may register the PCRF component 302 to receive updates when there are changes to the spending information stored in the OCS component 304.

With reference to FIG. 4, in determination operation 342, the OCS component 304 may determine that there are updates/changes to the spending information stored in the OCS component 304. For example, the OCS component 304 may determine that a status value of a "Policy Counter" parameter or data structure has changed. In operation 344, the OCS component 304 may generate a "Spending-Limit-Report" message that includes the updates/changes to the spending information, and send the "Spending-Limit-Report" message to the PCRF component 302. In operation 346, the PCRF component 302 may acknowledge the receipt of the updated information by sending a "Spending-Limit-Report" response message to the OCS component 304.

There are a number of challenges overcome by this invention. One major one is the high levels of signaling that may occur at a point in time when there are a large number of changes in state (e.g. at the end of a billing cycle). This can allow the charging system to gradually inform the policy management system of known future changes in state, which will not only reduce the overall amount of signaling, but also phase the signaling over a longer period of time.

Figure 5:
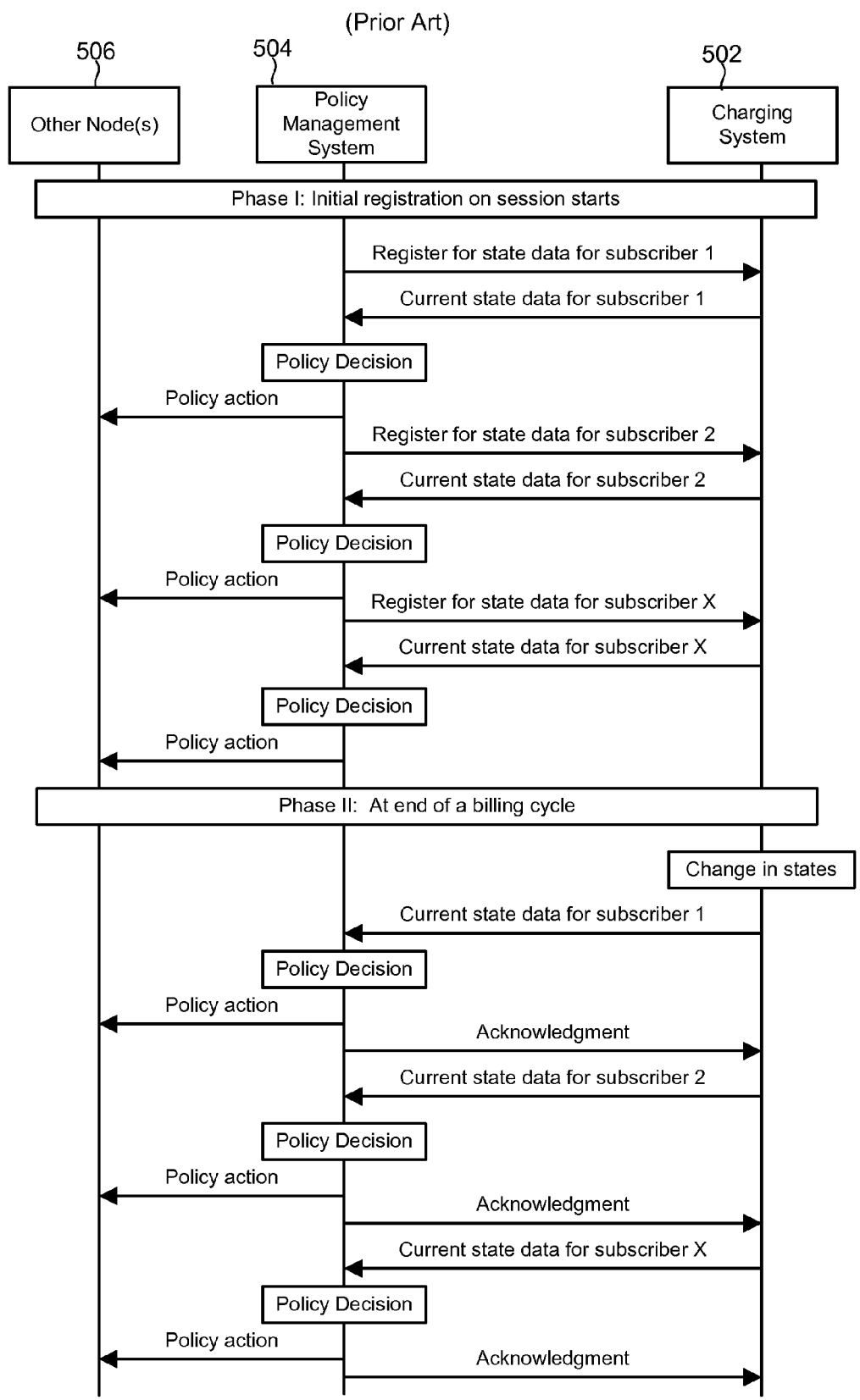
FIG. 5 is a call flow diagram illustrating information flows between a policy management system and a charging system before and after a billing cycle period change.
Figure 6:
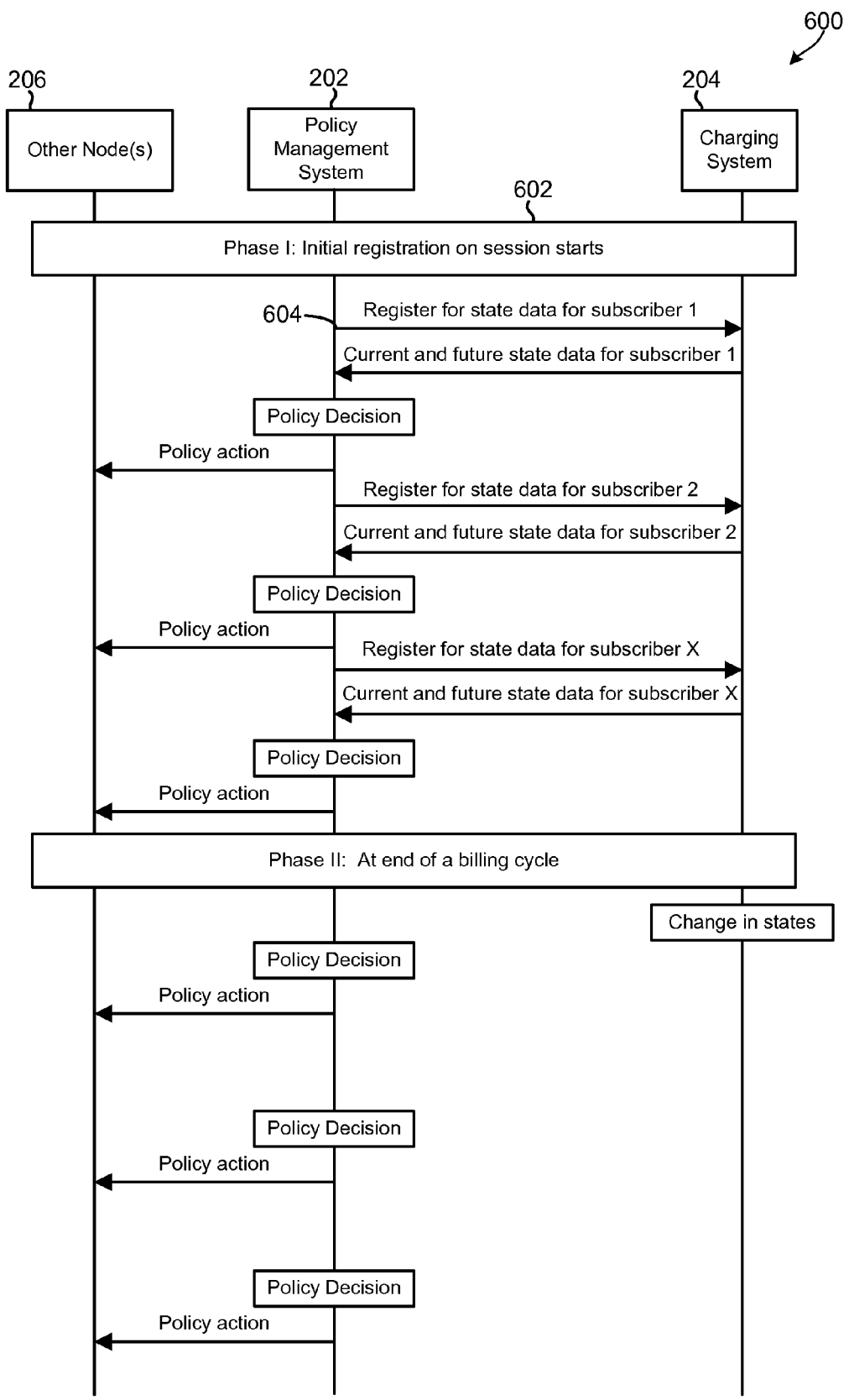
FIG. 6 is a call flow diagram illustrating information flows between a policy management system and a charging system before and after a billing cycle period change in accordance with an embodiment.

The reduction of signaling is illustrated by comparing FIGS. 5 and 6. Specifically, FIG. 5 illustrates a prior art method of communicating updates to information in a system that includes a conventional charging system 502 and a conventional policy management system 504. FIG. 6 illustrates an embodiment method 600 of communicating information between a charging system 204 and a policy management system 202.

FIG. 5 illustrates that, in Phase 1, a conventional policy management system 504 may register for state information about a number of subscribers (as subscribers start their data session). Also in phase 1, a conventional charging system 502 may report the current state information to the policy management system. At a later point in time, during Phase 2, the state information in the conventional charging system 502 changes. In response to detecting these changes, the conventional charging system 502 sends an update to the policy management system 504, and the policy management system 504 responds with an acknowledgement. That is, after the charging system detects the change in state, there are two messages (i.e., an update message and a response message) communicated for each subscriber. Since telecommunication systems typically include a very large number of subscribers, sending two messages per subscriber for each update may cause a "signaling storm" that negatively impacts the latency or performance characteristics of the network or user equipment.

FIG. 6 illustrates an embodiment method 600 of communicating information between a charging system 204 and a policy management system 202. In operation 602, the policy management system 202 may determine that one or more policy decisions require information from a charging system 204 and/or establish a communication link/session with the charging system 204. In operation 604, the policy management system 202 may register for state data for the subscriber. In embodiment, the policy management system 202 may register for the state data by requesting to receive the current state of the required information. For example, the policy management system 202 may send the charging system 204 a "Spending-Status-Notification" request message to register to receive a subscriber's current balance state and to be notified of any updated to such information.

The charging system 204 may respond to each request from the policy management system 202 with not only the current state, but also with one or more expected future states and the times/dates that these states take effect. The policy management system 202 may be configured to store this information, and make a policy decision at that the appropriate time/date. This means that when there is a change in the state information, the charging system 204 does not need to send updated communication messages to the policy management system 202 and thus no additional signaling is required. This is a more efficient use of network resources that may improve the latency and/or performance characteristics of the network.

In an enhanced embodiment, the charging system 204 may be configured to compute a probability or confidence value that indicates the likelihood of a future state change or event occurring. The charging system 204 may send the probability/confidence values to the policy management system 202 in the same communication message as the future state information. In an embodiment, the policy management system 202 may be configured to use these probability/confidence values to determine whether to request updated information from the charging system or to make a policy decision at the appropriate time/date based on the previously received information.

In an embodiment, method 600 may be applied to a service pass scheme in which a subscriber purchases a pass for a short period of time—e.g. increased bandwidth for 2 hours, or unlimited data for a day. In this embodiment, the charging system 204 may be configured to send the start time/date of the service pass and information identifying when the service pass will finish/terminate to the policy management system 202. The policy management system 202 may use this information to update its policies at those times. In an embodiment, the charging system 204 may be configured to send multiple future states in a single response to the policy management system 202 (e.g. information identifying when the service pass will finish/terminate and information indicating when the current billing period finishes/terminates).

The various embodiments allow the policy management system to make advance decisions about the policies or data that it sends to other nodes. This could include creating deferred rules on the Gx, Gxx, Sd or similar interfaces, where these deferred rules may be for PCC, QoS, ADC rules or similar; sending information to a subscriber repository about future states of the subscriber; sending information to a recommendation system about future states of the subscriber; delaying modifying another node in order to reduce signaling if the time of the future state is in the near future; notifying the subscriber of expected future changes in state (e.g. by using SMS, e-mail, pop-up etc.); and obtaining and collating information from other nodes in advance of a state change happening.

Figure 7:
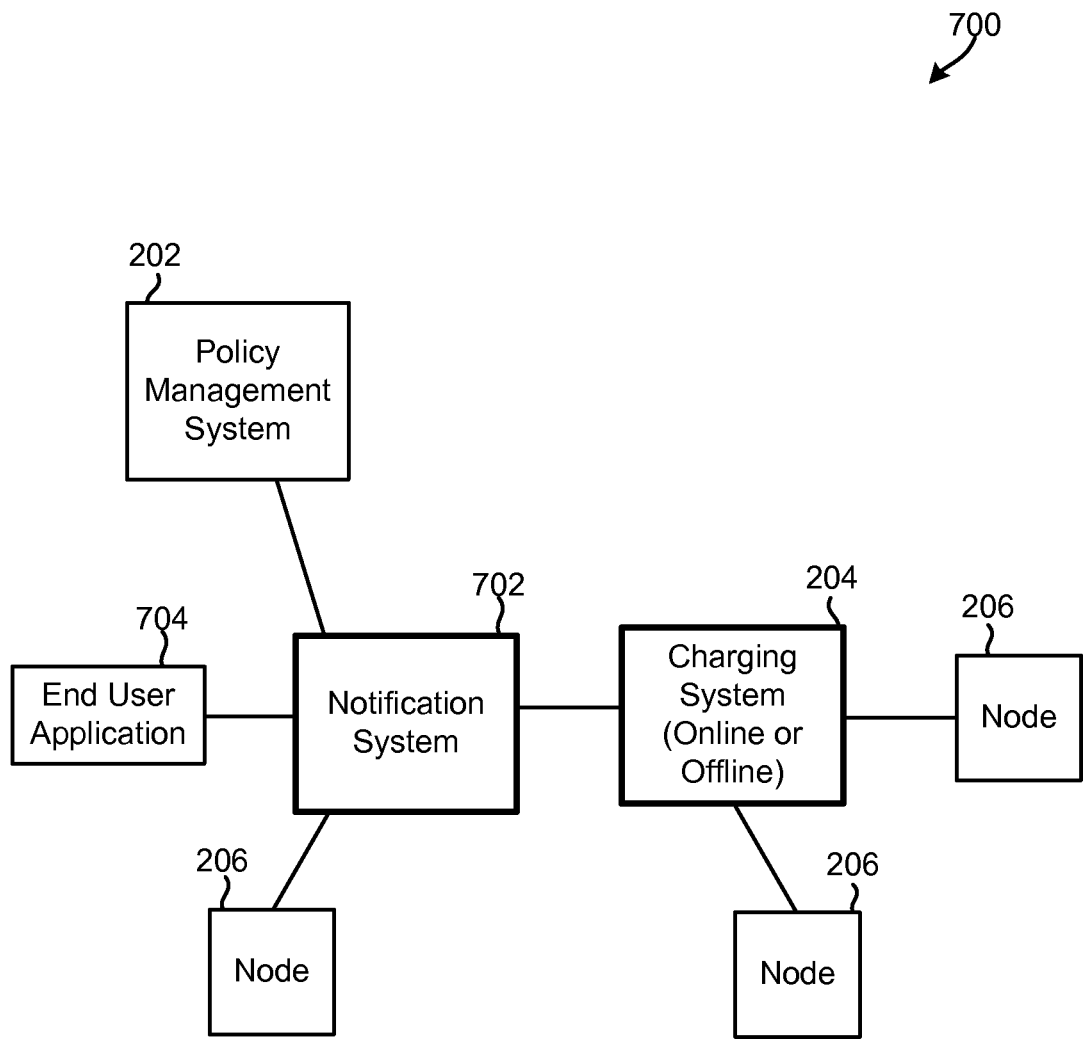
FIG. 7 is a block diagram illustrating components in telecommunication network that includes a notification system and which is suitable for use by the various embodiments.

FIG. 7 illustrates an embodiment communication system 700 that includes a policy management system 202, a charging system 204, a plurality of network nodes 206, a notification system 702, and an end-user application 704 component. In an embodiment, the notification system 702 may include a short message service (SMS) system.

In an embodiment, the charging system 204 may be configured to send communication messages that include current and future information to the notification system 702 (i.e., as opposed to sending them directly to the policy management system 202). The notification system 702 may be configured to intelligently inform the other nodes in the network, such as the policy management system 202, a subscriber device (e.g. over SMS or to an application running on the device), or any other node that may be interested in knowing about state changes in the charging system.

An advantage of this embodiment is that it may further reduce signaling, and thus network traffic. The charging system 204 may be configured to notify the notification system 702 and it can selectively inform the other nodes (rather than every node connecting to the charging system). The notification system 702 may be configured to determine whether the information is relevant to each node, and send communication messages to only the nodes for which the information is relevant.

Another advantage of this embodiment is that nodes that only need to know about portions of the information are informed of only those portions that are relevant to them. This reduces the amount of information communicated in the network and stored in the nodes. Further, the notification system 702 may be configured to intelligently determine when to inform the nodes and/or how often the nodes should receive this information (e.g. node X only needs to receive information once per day, so the notification system will aggregate a day's worth of information).

Yet another advantage of this embodiment is that status information can be combined with information from other nodes in order to make more complete notifications, such as by combining real-time charging status information from the charging system with information from past bills or usage history.

Another approach to reduce the amount of signaling is to implement a group based approach, where certain groups of subscribers receive certain treatment. For example, all subscribers whose monthly balance is reset at midnight on the last day of the month could be a member of 'Group A', subscribers who have a daily balance change at a certain time could be in 'Group B'. This allows the charging system 204 to send a single notification to change the state of all members of a group at a specific time.

Figure 8:
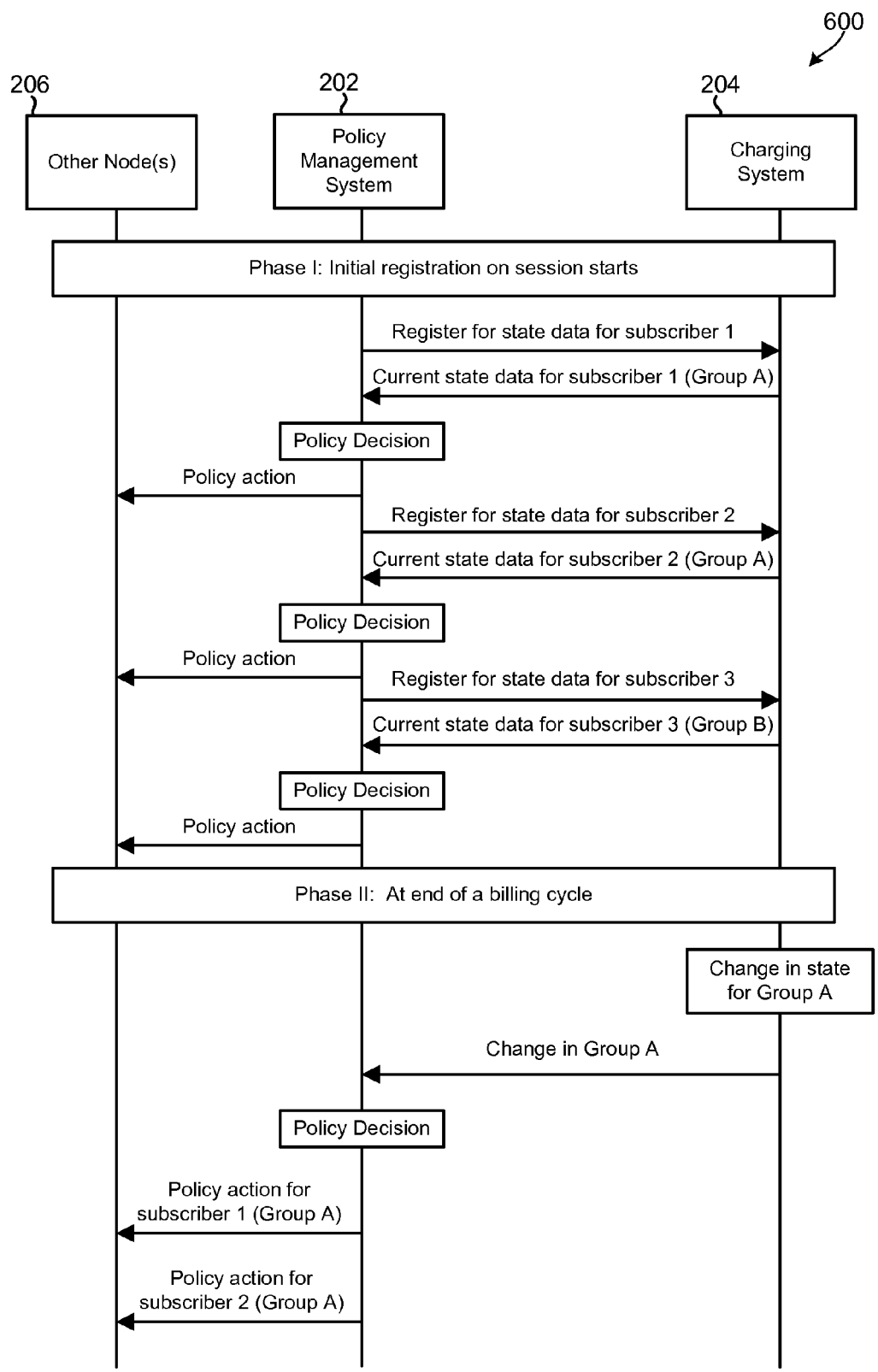
FIG. 8 is a call flow diagram illustrating information flows between a policy management system and a charging system immediately before and after a billing cycle period change in an embodiment that includes subscriber groups.

FIG. 8 illustrates an embodiment method 800 of communicating information between a charging system 204 and a policy management system 202 using a group based approach. In the example illustrated in FIG. 8, the policy management system 202 may be configured to initiate sessions for each subscriber, of which there are three. The charging system 204 may be configured to allocate different groups to each subscriber. In this example, subscriber 1 and subscriber 2 belong to Group A, and subscriber 3 belongs to Group B. Group A is a group whose balance gets reset at the end of a billing cycle. So, when this occurs, the charging system 204 may send a single notification to the policy management system to inform it of a state change for all members of Group A. The policy management system can in turn use this to only send policy changes relating to the members of Group A (in this case subscriber 1 and subscriber 2).

Extending this to a larger group where there may be millions of subscribers in a single group, the charging system 204 will still only need to send a single message to the policy management system 202 in order to inform it of a state change for all members in that group.

In an enhanced embodiment, the grouping may be recorded in an subscriber data store or pre-configured between the policy management system 202 and the charging system 204 (i.e., it does not need to be allocated by the charging system).

In a further embodiment, future group based information may also be sent (e.g., at this time in the future, all subscribers in Group B will change state from OUT_OF_CREDIT to IN_CREDIT). This may be useful in case the policy management system 202 determines to send future rules to other nodes.

In an enhanced embodiment the charging system 204 may be configured to send grouping information in a different type of message (like a meta-message) to the policy management system 202. This may modify the grouping categories, move subscribers between groups, merge/split groups, etc. In an embodiment, subscribers may be in more than one group at a time. In an embodiment, subscribers may not be in any groups. In an embodiment, multiple groups can be modified at the same time in different ways (e.g., the union of Group A and Group B, the intersection of Group A and Group B, the people in Group A who are not in Group B, etc.). In an embodiment there can be any number of groups.

In yet another enhanced embodiment, an external node may be configured to provision and modify the groups in the policy management system 202 and/or the charging system 204. This may be used to, for example, dynamically set up a group for people in a specific location so that their states can be collectively modified.

Figure 9:
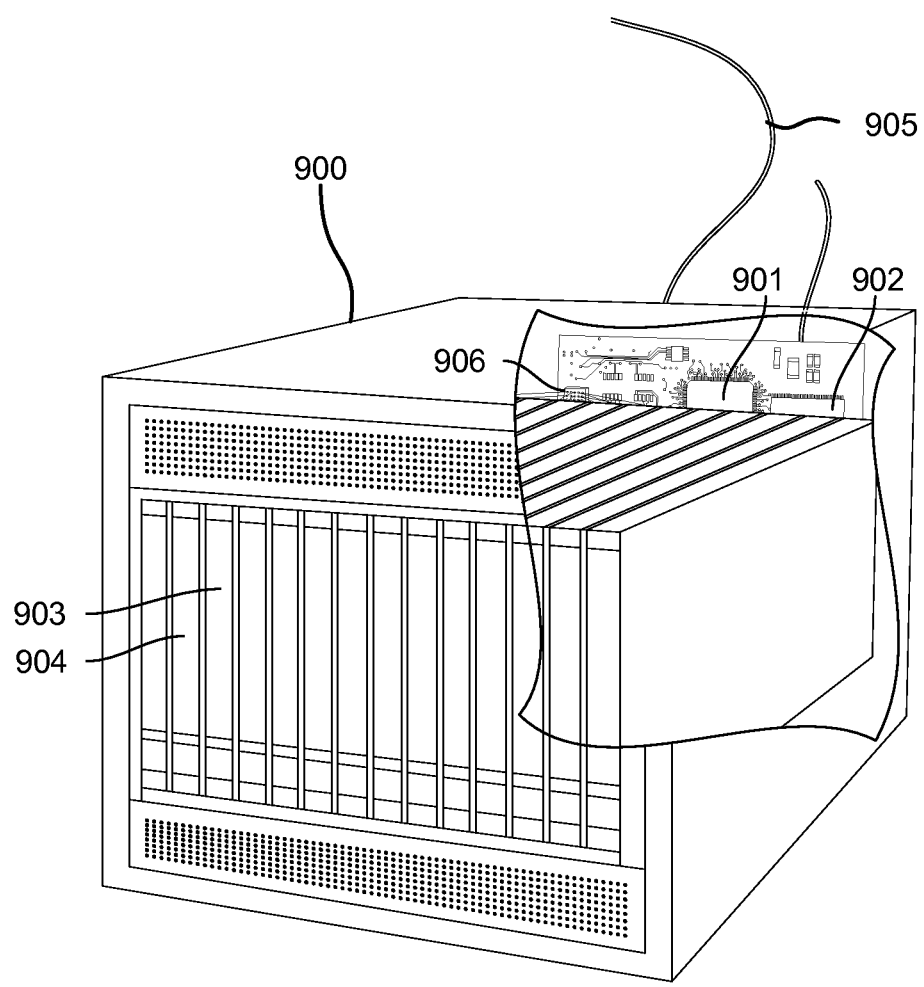
FIG. 9 is a component diagram of server suitable for use with the various embodiments.

The various embodiments may be implemented on any of a variety of commercially available server devices, such as the server 900 illustrated in FIG. 9. Such a server 900 typically includes a processor 901 coupled to volatile memory 902 and a large capacity nonvolatile memory, such as a disk drive 903. The server 900 may also include a floppy disc drive, compact disc (CD) or DVD disc drive 906 coupled to the processor 901. The server 900 may also include network access ports 904 coupled to the processor 901 for establishing data connections with a network 905, such as a local area network coupled to other operator network computers and servers.

The processor 901 may be any programmable microprocessor, microcomputer or multiple processor chip or chips that can be configured by software instructions (applications) to perform a variety of functions, including the functions of the various embodiments described below. Multiple processors 901 may be provided, such as one processor dedicated to wireless communication functions and one processor dedicated to running other applications. Typically, software applications may be stored in the internal memory 902, 903 before they are accessed and loaded into the processor 901. The processor 901 may include internal memory sufficient to store the application software instructions.

Figure 10:
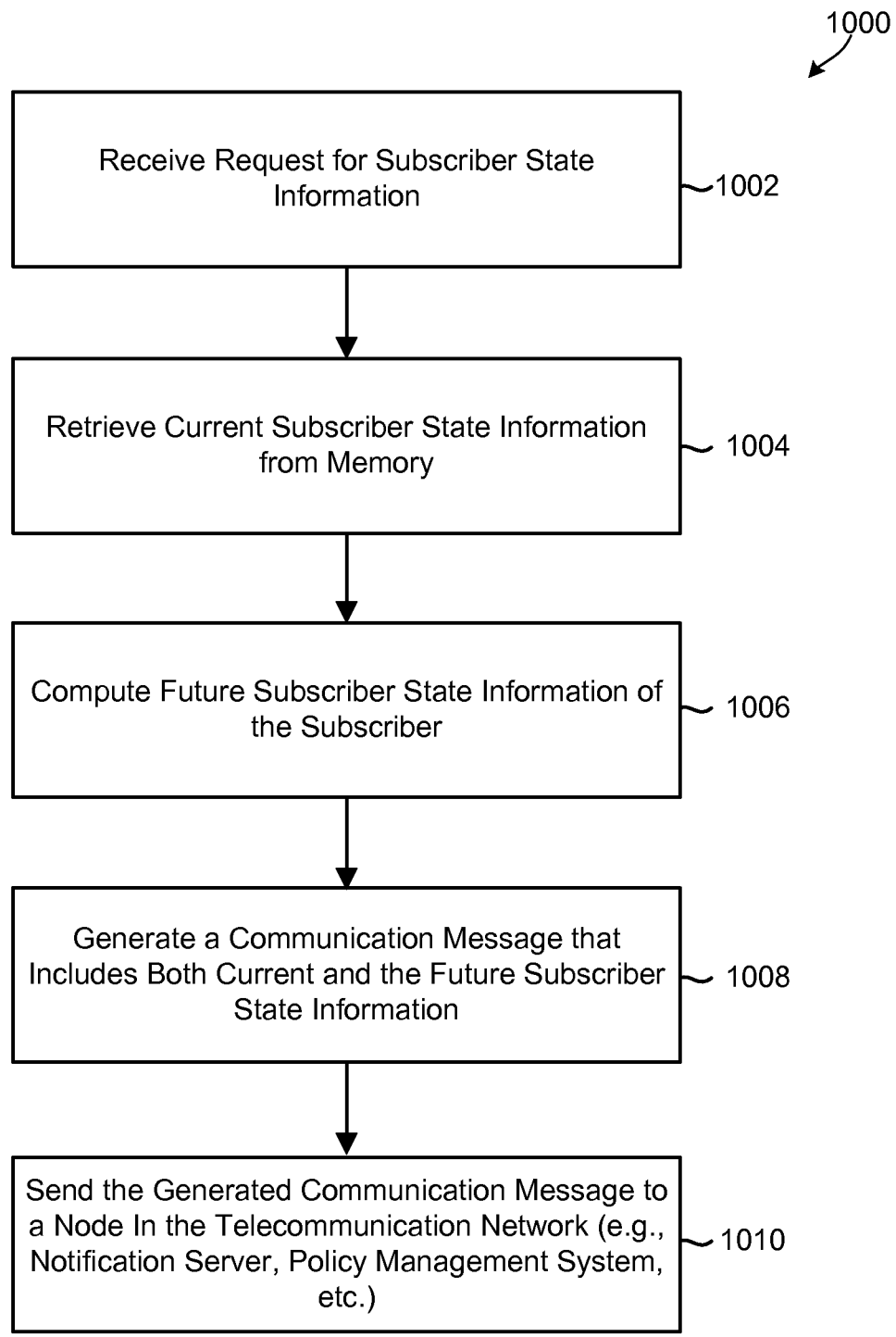
FIG. 10 is a process flow diagram illustrating an embodiment method of communicating information in a telecommunication network.

FIG. 10 illustrates an embodiment method 1000 of communicating information in a telecommunication network. In operation 1002, a processor in a server of charging system may receive a request for subscriber state information relating to a subscriber from a server computing device in the telecommunication network. The server computing device may be a notification system 702 component, a policy management system 202 component, etc. In operation 1004, the processor may retrieve current subscriber state information from a memory of the charging system.

In operation 1006, the processor may determine, compute, or identify future subscriber state information of the subscriber. This may be accomplished by analyzing and/or generating balance information, time-based information, time values, probability values, etc. For example, the processor may access the subscriber's account information to determine that the subscriber has a daily or monthly spending allowance that is automatically replenished at a certain time or date, and use the replenishment time/date to generate the future subscriber state information.

In operation 1008, the processor may generate a communication message that includes both the current subscriber state information that was retrieved from the local memory in operation 1004 and the future subscriber state information that was computed/determined/identified in operation 1006. In operation 1010, the processor may send the generated communication message to the server computing device, such as a notification system component, policy management system component, etc.

The foregoing method descriptions and the process flow diagrams are provided merely as illustrative examples and are not intended to require or imply that the blocks of the various aspects must be performed in the order presented. As will be appreciated by one of skill in the art the order of steps in the foregoing aspects may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a non-transitory computer-readable or processor-readable storage medium. The steps of a method or algorithm disclosed herein may be embodied in a processor-executable software module, which may reside on a non-transitory processor-readable or computer-readable storage medium. Non-transitory processor-readable and computer-readable media may be any available storage media that may be accessed by a computer or a processor of a computing device. By way of example, and not limitation, such non-transitory processor-readable or computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer or processor of a computing device. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory processor-readable medium and/or non-transitory computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of communicating information in a telecommunication network, comprising:
   receiving in a processor of a first server computing device in the telecommunication network a request for subscriber state information relating to a subscriber from a second server computing device in the telecommunication network;
   retrieving current subscriber state information of the subscriber from memory and determining predicted future subscriber state information of the subscriber in response to receiving the request for subscriber state information from the second server computing device;
   generating a communication message that includes the current subscriber state information and the predicted future subscriber state information; and
   sending the generated communication message from the first server computing device to the second server computing device.

2. The method of claim 1, wherein determining predicted future subscriber state information of the subscriber comprises generating information that includes at least one of:
   balance information;
   a time value; and
   a probability value.

3. The method of claim 1, wherein sending the generated communication message from the first server computing device to the second server computing device comprises sending the generated communication message from the first server computing device to a policy management system server.

4. The method of claim 1, wherein sending the generated communication message from the first server computing device to the second server computing device comprises sending the generated communication message from the first server computing device to a notification system server.

5. The method of claim 4, further comprising:
   receiving the communication message in the notification system server; and
   sending a subset of the information included in the received communication message to a user equipment device.

6. The method of claim 3, wherein sending the generated communication message from the first server computing device to the policy management system server comprises sending the generated communication message from a charging system server to the policy management system server.

7. The method of claim 1, wherein generating the communication message that includes the current subscriber state information and the predicted future subscriber state information comprises generating the communication message to include current and predicted future information for a group of subscribers.

8. The method of claim 7, wherein generating the communication message to include current and predicted future information for the group of subscribers comprises identifying the group of subscribers via a group name.

9. The method of claim 1, wherein determining predicted future subscriber state information of the subscriber comprises generating information that includes a recurring rule.

10. The method of claim 1, wherein generating the communication message that includes the current subscriber state information and the predicted future subscriber state information comprises generating the communication message to include service start time information and service termination information.

11. A server computing device in a telecommunication network, the server computing device comprising:
    a memory; and
    a processor coupled to the memory, wherein the processor is configured with processor-executable instructions to perform operations comprising:
      receiving a request for subscriber state information relating to a subscriber from a second server computing device in the telecommunication network;
      retrieving current subscriber state information of the subscriber from the memory and determining predicted future subscriber state information of the subscriber in response to receiving the request for subscriber state information from the second server computing device;
      generating a communication message that includes the current subscriber state information and the predicted future subscriber state information; and
      sending the generated communication message from the server computing device to the second server computing device.

12. The server computing device of claim 11, wherein the processor is configured with processor-executable instructions to perform operations such that sending the generated communication message from the server computing device to the second server computing device comprises sending the generated communication message from a charging system server to a policy management system server.

13. The server computing device of claim 11, wherein the processor is configured with processor-executable instructions to perform operations such that sending the generated communication message from the server computing device to the second server computing device comprises sending the generated communication message to a notification system server.

14. The server computing device of claim 13, wherein the processor is configured with processor-executable instructions to perform operations such that determining predicted future subscriber state information of the subscriber comprises generating information that includes a recurring rule.

15. The server computing device of claim 11, wherein the processor is configured with processor-executable instructions to perform operations such that generating the communication message that includes the current subscriber state information and the predicted future subscriber state information comprises generating the communication message to include current and future information for a group of subscribers.

16. A non-transitory computer readable storage medium having stored thereon processor-executable software instructions configured to cause a processor of a first server computing device in a telecommunication network to perform operations comprising:
receiving a request for subscriber state information relating to a subscriber from a second server computing device in the telecommunication network;
retrieving current subscriber state information of the subscriber from memory and determining predicted future subscriber state information of the subscriber in response to receiving the request for subscriber state information from the second server computing device;
generating a communication message that includes the current subscriber state information and the predicted future subscriber state information; and
sending the generated communication message from the first server computing device to the second server computing device.

17. The non-transitory computer readable storage medium of claim 16, wherein the processor is configured with processor-executable instructions to perform operations such that sending the generated communication message from the first server computing device to the second server computing device comprises sending the generated communication message from a charging system server to a policy management system server.

18. The non-transitory computer readable storage medium of claim 16, wherein the processor is configured with processor-executable instructions to perform operations such that sending the generated communication message from the first server computing device to the second server computing device comprises sending the generated communication message from the first server computing device to a notification system server.

19. The non-transitory computer readable storage medium of claim 18, wherein the processor is configured with processor-executable instructions to perform operations such that determining predicted future subscriber state information of the subscriber comprises generating information that includes a recurring rule.

20. The non-transitory computer readable storage medium of claim 16, wherein the processor is configured with processor-executable instructions to perform operations such that generating the communication message that includes the current subscriber state information and the predicted future subscriber state information comprises generating the communication message to include current and future information for a group of subscribers.

* * * * *